US00RE41547E

(19) United States
(12) Reissued Patent
Ha

(10) Patent Number: US RE41,547 E
(45) Date of Reissued Patent: Aug. 17, 2010

(54) APPARATUS AND A METHOD FOR AVOIDING THE ACCIDENTAL TERMINATION OF COMPUTER POWER

(75) Inventor: Jong-Uk Ha, Suwon-si (KR)

(73) Assignee: Samsung Electronics Co., Ltd, Suwon-si (KR)

(21) Appl. No.: 11/374,647

(22) Filed: Mar. 14, 2006

Related U.S. Patent Documents

Reissue of:
(64) Patent No.: 6,115,824
Issued: Sep. 5, 2000
Appl. No.: 09/009,742
Filed: Jan. 20, 1998

(30) Foreign Application Priority Data

Apr. 18, 1997 (KR) ..... 97-14556

(51) Int. Cl.
*G06F 1/00* (2006.01)
*G06F 1/32* (2006.01)
*G06F 3/00* (2006.01)

(52) U.S. Cl. ..... 713/300; 713/330; 715/700
(58) Field of Classification Search ..... 713/300, 713/330; 715/700

See application file for complete search history.

(56) References Cited

U.S. PATENT DOCUMENTS 4,569,026 A * 2/1986 Best ..... 715/716
4,809,321 A * 2/1989 Morganstein et al. .. 379/209.01
4,907,150 A * 3/1990 Arroyo et al.
5,241,655 A * 8/1993 Mineki et al. ..... 715/835
5,339,446 A * 8/1994 Yamasaki et al. ..... 713/340
5,446,904 A * 8/1995 Belt et al. ..... 713/323
5,586,334 A * 12/1996 Miyazaki et al. ..... 713/300
5,598,567 A * 1/1997 Ninomiya ..... 713/310
5,640,574 A * 6/1997 Kawashima ..... 713/340
5,862,394 A * 1/1999 Watts et al. ..... 713/330

* cited by examiner

*Primary Examiner*—Thomas Lee
*Assistant Examiner*—Ji H Bae
(74) *Attorney, Agent, or Firm*—Stanzione & Kim, LLP

(57) ABSTRACT

A method and an apparatus for confirming a power off signal generated by the aligning of a power switch into an off position. The operator can select from four options prior to the power to the computer system being terminated. This should improve the efficiency of document product ion, and reduce the amount of data lost due to accidental power terminations.

23 Claims, 4 Drawing Sheets

APPARATUS AND A METHOD FOR AVOIDING THE ACCIDENTAL TERMINATION OF COMPUTER POWER

Matter enclosed in heavy brackets [ ] appears in the original patent but forms no part of this reissue specification; matter printed in italics indicates the additions made by reissue.

CLAIM OF PRIORITY

This application makes reference to, incorporates the same herein, and claims all rights accruing thereto under 35 U.S.C. § 119 through my patent application entitled A Method for Confirming Power-Off of a Computer earlier filed in the Korean Industrial Property Office on the 18th day of April 1997 and there duly assigned Ser. No. 1997/14556.

BACKGROUND OF THE INVENTION

1. Field of the Invention

The present invention relates to the managing of the power supply for a computer and, more specifically, to an apparatus and method for providing multiple power options to a user while confirming a request to turn off the computer.

2. Background Art

In general, when the power switch of a computer system is turned off, a power off signal is sent to the power supply that then terminates the power to the system. A computer system generally uses a central processing unit, a bus to transmit signals and data between various components, a random access memory (RAM), a read only memory (ROM), a real-time clock (RTC), an input device, a display device, a serial or parallel peripheral device, an auxiliary memory unit, an input device controller, a display device controller, serial and parallel ports, an auxiliary memory controller, a backup memory, and a power controller. The bus interconnects several system elements to the central processing unit and transmits related information to each element. The RAM, ROM, backup memory, power controller, and RTC are all connected to the central processing unit via the bus. The RAM provides various memory locations for the central processing unit's use when storing system software, storing user software, or storing operational data. The ROM contains the specific programs that the central processing unit needs to operate. The RTC stores information about time calculation and system structure. The backup memory is used by the system to store any information not kept in RAM that is saved for future use.

When power is terminated while unsaved data is still in volatile memory, vital data can be lost. Research has been directed towards power management in an effort to improve the smooth functioning of computer systems and to further improve techniques for preserving computer data. Some techniques developed, by way of example, are detailed in, for example, U.S. Pat. No. 5,586,334 to Miyazaki entitled Apparatus and Method for Suspending and Resuming Software on a Computer, U.S. Pat. No. 5,339,446 to Yamasaki entitled Power Supply and Method for use in a Computer System to Confirm a Save Operation of the Computer System and to Stop a Supply of Power to the Computer System After Confirmation, U.S. Pat. No. 5,640,574 to Kawashima entitled Portable Computer Apparatus Having a Display Capable of Displaying Power Management Information and Method of Controlling the Display, U.S. Pat. No. 5,598,567 to Ninomiya entitled Apparatus for Controlling Power Supply in a Computer System by Introducing Delays Before Activation and Deactivation of Power, and U.S. Pat. No. 4,907,150 to Arroyo entitled Apparatus and Method for Suspending and Resuming Software Applications on a Computer.

I have observed that when a power switch is accidentally turned off during the operation of a computer the power supplied to the computer is terminated regardless of whether a UPS system is attached to the computer. This causes the loss of data that has not previously been saved and can result in the loss of time and the needless duplication of work. I expect that a computer system that could avoid accidental shutdowns would increase the productivity of users, avoid the loss of data, and reduce the frustration and tedium resulting from the duplication of work.

SUMMARY OF THE INVENTION

Accordingly, it is an object of the present invention is to provide an improved apparatus and method for terminating the power to a computer system.

It is another object to provide an apparatus and a method for terminating the power to a computer system that avoids accidental shutdowns.

It is still another object to provide an apparatus and a method for terminating the power to a computer that avoids the loss of data.

It is yet another object to provide an apparatus and a method for terminating the power to a computer that increases the productivity of computer operators.

It is still yet another object to provide an apparatus and a method for terminating the power to a computer that reduces the frustration and tedium resulting from the duplication of work.

It is a further object to provide an apparatus and a method for terminating the power to a computer that confirms the operator's wish to terminate power before responding to the turning of the power switch to the off position.

To achieve these and other objects, an apparatus and a method are used to determine whether a user actually desired to terminate the power to the computer when the computer's power switch was moved to the "off" position. The computer confirms the operator's desire by displaying a power managing window or menu. This window presents the user with four choices. The user can select the "Cancel" button and the computer system will operate as if the power switch were still in the "on" position. The user can select the "Suspend" button and the computer system will then go into a hibernation or sleep mode. The user can select the "Reset" button and the system will quit any programs that are currently running and reboot the computer. And lastly, the operator can select the "Power-Off" button and the computer will exit and quit any programs currently running and turn off.

A second embodiment of the above apparatus and method activates a timer once the power managing window or menu is displayed. If a preset amount of time passes without the user selecting one of the four available options then the computer automatically turns off.

BRIEF DESCRIPTION OF THE DRAWINGS

A more complete appreciation of this invention, and many of the attendant advantages thereof; will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 4:
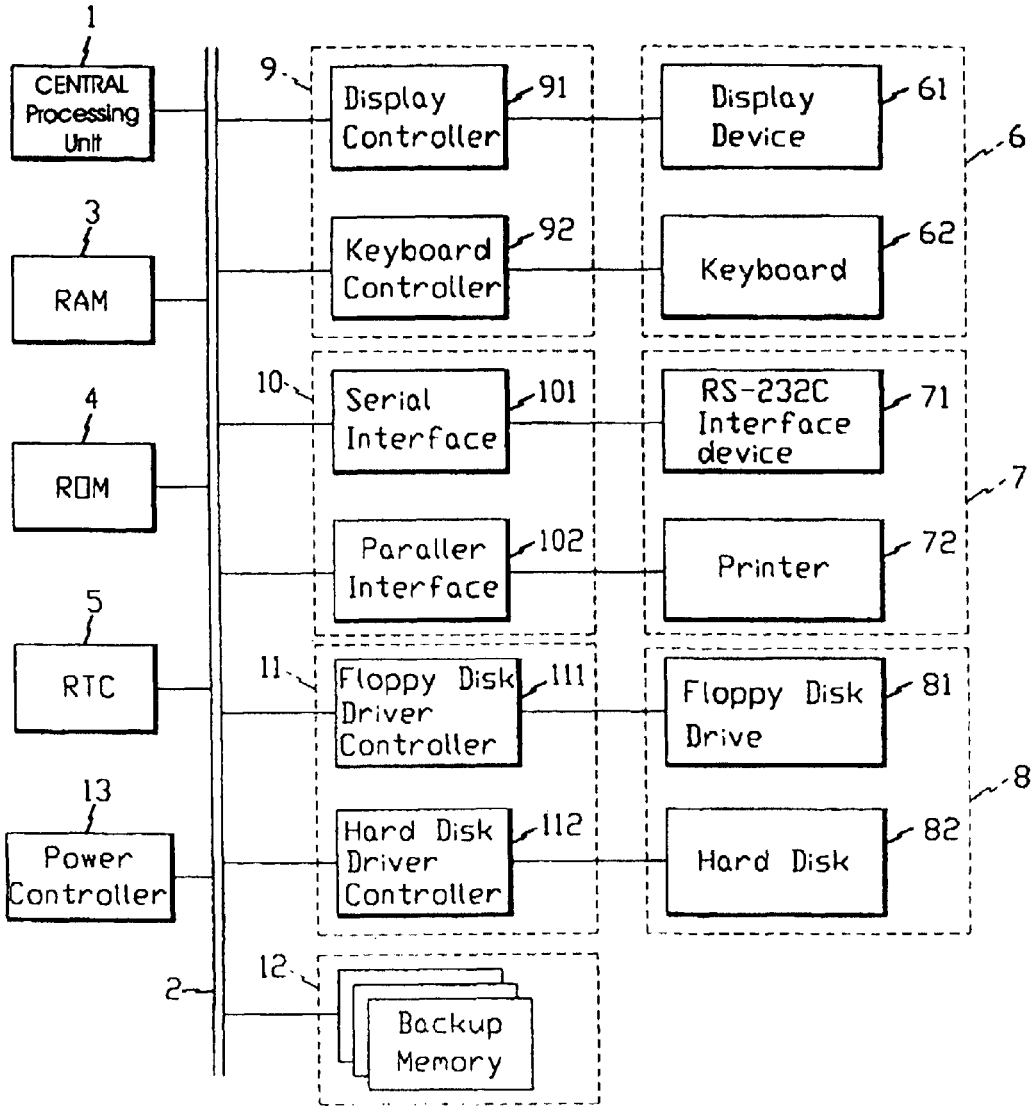
FIG. 4 is a block diagram illustrating a computer system.

Turning now to the drawings, FIG. 4 illustrates a block diagram of a computer system. This computer system may entail central processing unit 1, bus 2, random access memory (RAM) 3, read only memory (ROM) 4, real-time clock (RTC) 5, user interface components 6, serial and parallel peripheral devices 7, auxiliary memory components 8, user interface controllers 9, serial and parallel ports 10, auxiliary memory controllers 11, backup memory 12, and power controller 13. Bus 2 connects RAM 3, ROM 4, RTC 5, power controller 13, and the backup memory 12 to the central processing unit 1 and other system components. RAM 3 provides memory locations for central processing unit 1 to store system software, user software, and operational data. ROM 4 contains programs that have the specific instructions necessary to enable the central processing unit 1 to operate. RTC 5 stores the information necessary to perform time calculations. User interface device 6 may include display device 61 and keyboard 62. Serial and parallel peripheral devices 7 may include a standard serial port, such as the RS-232C interface device 71, and a printer 72. The auxiliary memory unit 8 may include a floppy disk drive 81 and a hard disk drive 82. User interface controller 9 may include display controller 91 and keyboard controller 92. Serial/parallel port 10 may include serial interface 101 and parallel interface 102. Auxiliary memory controllers 11 may include floppy disk drive controller 111 and hard disk drive controller 112. Backup member 12 contains information about the RAM content.

I have found that one problem with many computer systems is the loss of data when the power switch is accidentally turned to an off position. This lowers the operator's productivity and increases the level of frustration experienced by the operator.

Figure 1:
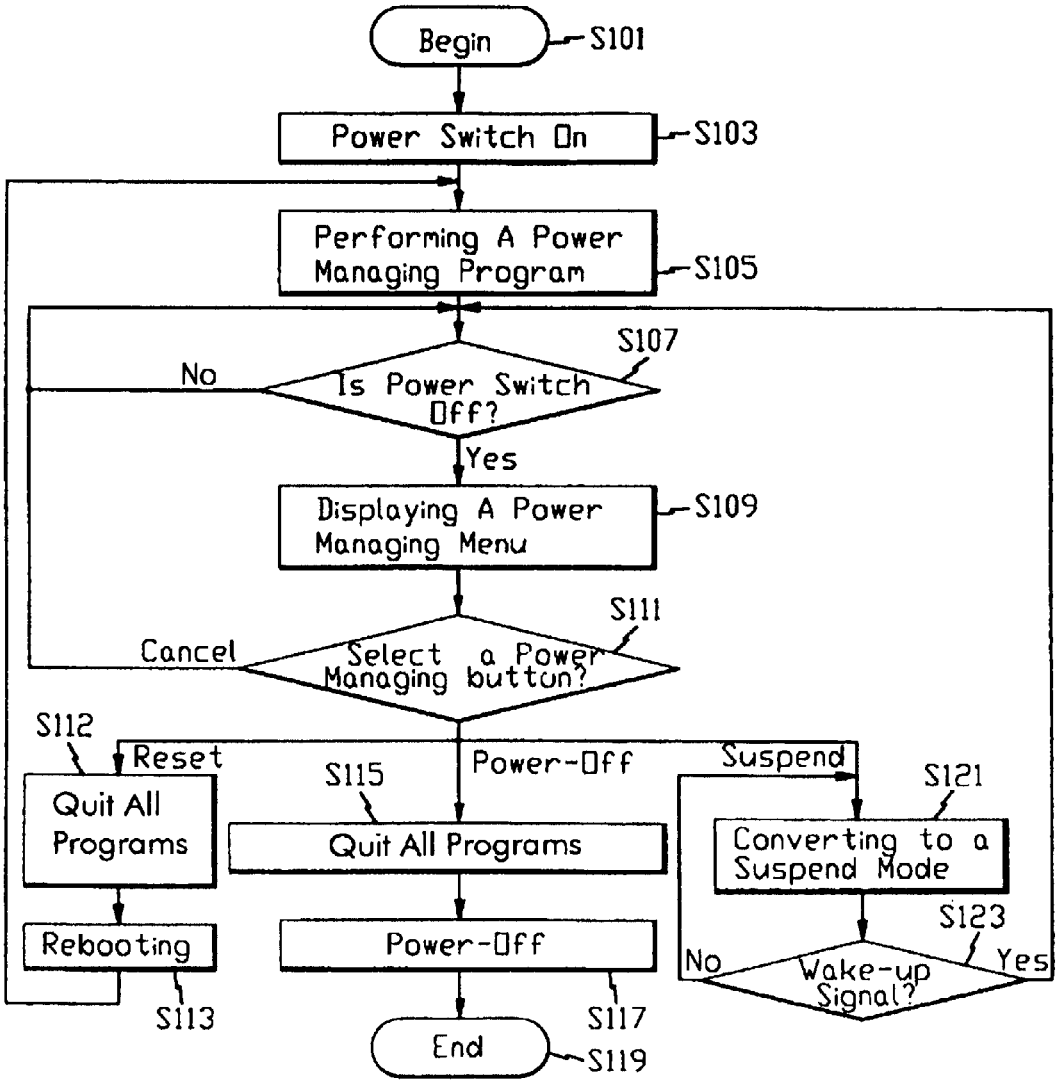
FIG. 1 is a flow chart illustrating a method in accordance with the principles of the first embodiment of the present invention for confirming the termination of power to a computer.

The present invention avoids such accidental terminations, as shown in the first embodiment of the present invention illustrated in FIG. 1. First, in steps S101 through S105, the computer is turned on and a power management program is automatically activated. Then, during step S107, the power management program determines whether the power switch is on. This step is repeated until the program determines that the power switch is in the off position. After the program determines that the switch is in the off position, in step S109, the display device displays a power managing window or menu. In step S111, an operator selects one of the four available options in the control window or menu.

The four options are to cancel, reboot, terminate power, and suspend operations. If the operator selects the "Cancel" button then the power managing program returns to step S107 and will treat the power switch as if it is in the "on" position. If an operator selects the "Reboot" or "Reset" button then the program quits any actively running programs during step S112 and then, during step S113 reboots the computer. After the computer has rebooted the program re-starts and progresses through to step S105. The next time the power managing program checks on the position of the power switch it will not treat the power switch as being in the off position until it has first been placed in an on position. Alternatively, a mechanism can be used to automatically return the power switch to the on position after the "Reboot" button has been selected.

If an operator selects the "Power-Off" button then the program quits any actively running programs during step S115. Then, in step S117, the computer power is terminated and the program ends at step S119.

In an operator selects the "Suspend" button then the power managing program changes the mode of the central processing unit 1 to a sleep or hibernate mode in step S121. In step S123 the computer determines if it is time for a wake up signal and, if so, returns to step S107 and treats the power switch as if it was in the "on" position and, if not, returns to step S121.

The operation of a computer system using a power management program designed according to the first embodiment of the present invention is described below. When a power switch is turned to the "on" position, the computer is powered and begins to boot up during steps S101 through S103. Then, central processing unit 1 performs a Power Off Self Test (POST) on every hardware component in the computer system. After it is determined that every hardware component in the computer system is operating normally, central processing unit 1 processes the instructions contained in the Basic Input Output System (BIOS). The BIOS further boots the computer by activating a driving program inside the computer, the AUTOEXEC.BAT file. The AUTOEXEC.BAT file then activates other programs or applications as well as the power managing program in step S105.

After the computer booting process is completed, the computer system processes the BIOS instructions and determines the operational position of the power switch and whether it is in the "off" position during step S107. If during step S107, it is determined that a power switch is in the "off" position, the BIOS outputs a power-off signal to the power managing program. When the power managing program receives the power-off signal, the computer system displays the power managing window or menu shown in FIG. 3 during step S109. The power managing window or menu has four buttons, the "Cancel", "Reboot" or "Reset", "Suspend", and "Power-Off" buttons.

The power managing program determines the button that is selected by the operator during step S111 and processes the appropriate sets of instructions. If the "Reset" button is selected any programs running on the computer system are terminated during step S112 and the computer is rebooted during step S113.

If the "Power-Off" button is selected then, during step S115, any active programs are halted and the power to the computer is terminated during step S117. When there are multiple programs running during either step S112 or step S115, every program is terminated.

If the "Suspend" button is selected then, during step S121, the computer enters into sleep or hibernate mode. Then, in step S123 the computer determines whether a wake-up signal is generated. When a wake-up signal is selected during step S123, the power managing program changes the operating state of the computer back to normal while restoring all previously active applications. The computer stays in a suspend or hibernate mode until a wake-up signal is generated. Once the operational state of the computer is returned to normal, the power managing program continues to monitor whether the power switch is again turned to the "off" position.

When the "Cancel" button is selected, the power managing program returns to step S107 to determine whether the power switch is turned to the "off" position. The power is not terminated and the power managing program repeats the above-described method. Before determining whether the power switch is again in the off position the power managing program waits to detect the switch in the on position. Alternatively, a mechanism can return the power switch to the on position after the "Cancel" button is selected.

Figure 2:
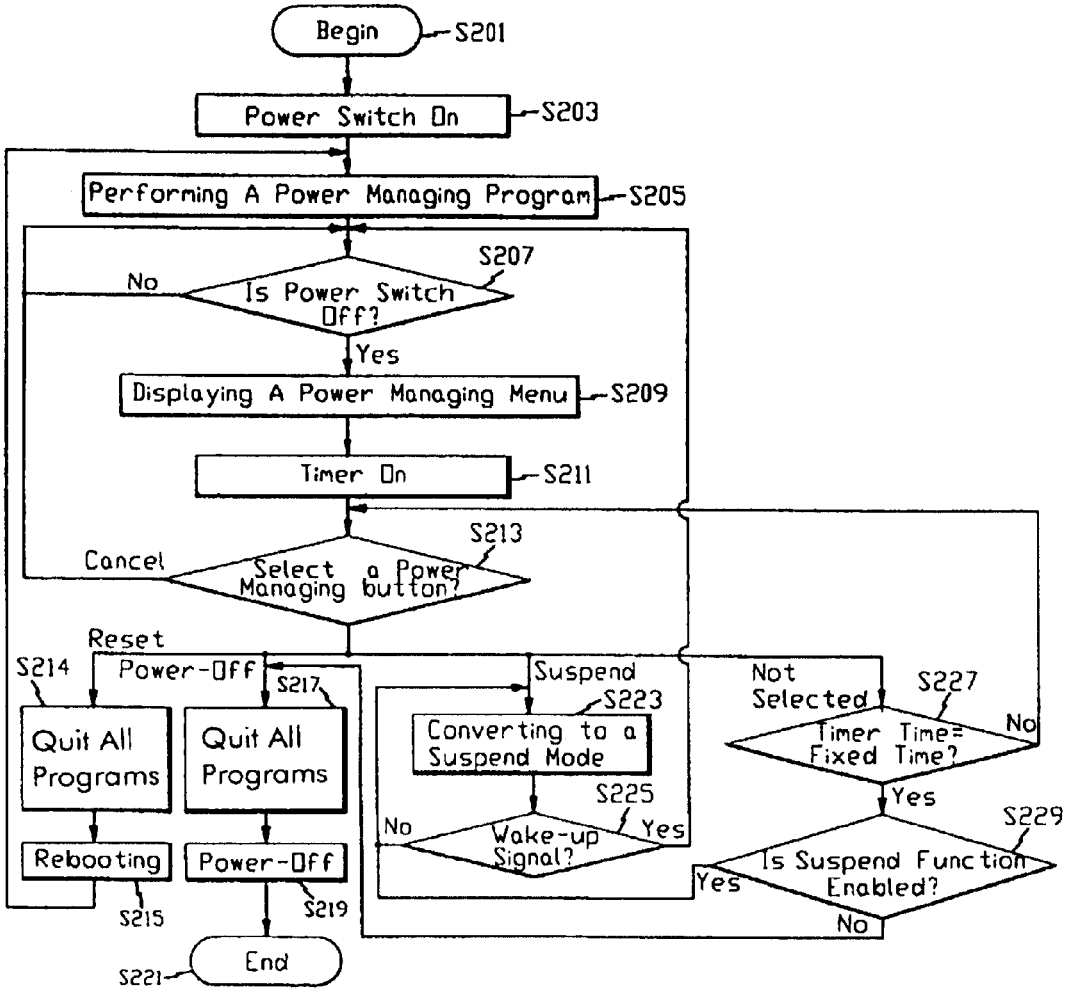
FIG. 2 is a flow chart illustrating a method in accordance with the second embodiment of the present invention for confirming the termination of power to a computer.

A second embodiment of the present invention is illustrated by the method of FIG. 2. First, during steps S201 through S205, the computer system is turned on, booted up, and the power managing program is activated. Then, during step S207 the computer system determines whether the power switch is in the "on" position. If the power switch is in the "on" position then the power managing program continues to check the position of the power switch. After the switch is detected in the "off" position, in step S209, the computer system displays the power managing window or menu shown in FIG. 3.

During step S211 the computer system activates a timer. After, during step S213, the program waits for the user to select one of the four buttons contained in the power managing window or menu. If the "Reboot" button is selected then, during steps S214 and S215, any active programs are terminated and the computer rebooted. If the "Power-Off" button is selected then, during steps S217 through S211, all active programs are ended and the power to the computer is terminated. When the "Suspend" button is selected the computer converts into suspend or sleep mode during step S223. The computer remains in suspend mode until a wake up signal is generated in step S225.

If the timer in step S227 reaches a predetermined amount of time before any of the buttons contained in the power managing menu or window are selected then, during step S229, the program changes the operational state of the computer to the suspend mode or when the suspend mode function is not enabled the program terminates power to the computer.

When the computer system is using a method that is in accordance with the second embodiment of the present invention the operation of the computer begins with the power switch being moved to the on position, in steps S201 through S203. Then central processing unit 1 performs the POST procedures on every hardware system of a computer. Once the central processing unit completes the POST procedures on every hardware component and determines that each component is functioning normally, instructions contained in the BIOS are processed and the computer starts to boot up. During the boot up of a computer, the AUTOEXEC-.BAT file is activated and eventually instructs the computer to run the power managing program, in step S205.

The BIOS also detects the position of the power switch and whether the power switch is in the "off" position, during step S207. The computer continues to check the power switch until it is detected in the "off" position. Once the power switch is detected in the "off" position, the BIOS sends a power-off signal to the power managing program.

Figure 3:
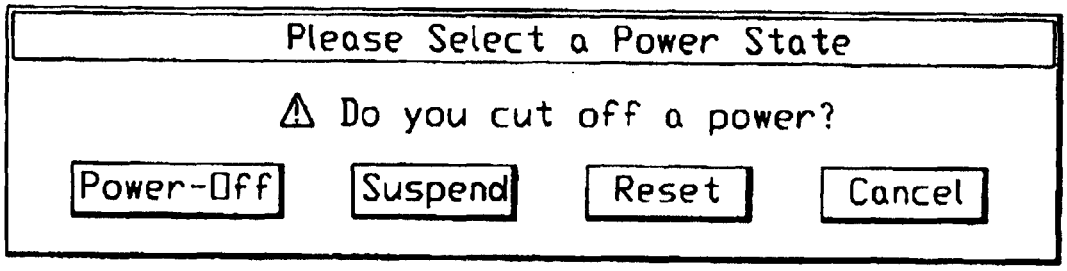
FIG. 3 illustrates a power managing menu used in both the method of FIG. 1 and FIG. 2.

After the power managing program receives the power-off signal, the computer system displays the power managing window or menu, in step S209, as shown in FIG. 3. Then, in step S211 a timer is activated. The power managing program then waits to see which of the four buttons is selected. If the "reset" button is selected then all active programs are quit in step S214. Then, in step S215, the computer reboots and returns to step S205. If the "power-off" button is selected then any active programs are terminated, in step S217, and the computer system is turned off, in steps S219 and S221. If there are multiple active programs when either the "Reset" button or the "Power-Off" button is selected, every program is terminated during either step S214 or step S217.

If the "Suspend" button is selected then the power managing program converts the current mode of the computer system to a suspend mode, during step S223. The power managing program then determines whether a wake-up signal is generated, during step S225. If a wake up signal is generated the power managing program converts the mode of the computer system back from the suspended mode to the mode it was previously in prior to going into the suspend mode. Once the computer leaves the suspend mode, the power managing program continues to monitor the power switch to determine when the switch is again placed in an "off" position.

If a predetermined amount of time passes without any button contained in the power managing window being selected, during step S227, then the computer determines whether a suspend function has been enabled, during step S229. If a suspend function is enabled then the program converts the computer system into suspend mode, during step S223. Otherwise, the program terminates the power to the computer during steps S217 through S221. If the "Cancel" button is selected then the power managing program returns to step S207 and continues to monitor the position of the power switch.

These methods for confirming a terminate power command while displaying many power options on a display device improves the efficiency of document production and reduces the amount of data lost due to accidental power terminations. Although two preferred embodiments of the present invention have been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A process for confirming a command to terminate power to a computer system, comprising the steps of:

determining whether a power switch has been moved to an off position while said computer system is powered;

displaying a menu for managing the power supplied to said computer system when said power switch is detected in said off position, said menu containing a plurality of buttons comprising a power-off button, a reboot button, a cancel button and a suspend button;

detecting a button in said menu that is selected by a user;

when said user selects said power-off button:

quitting any active program;

terminating the power to said computer system; and

*when said computer system is subsequently turned on,* returning to said step of determining whether said power switch has been moved to said off position;

when said user selects said cancel button:

returning to said step of determining whether said power switch has been moved to said off position;

when said user selects said suspend button:

changing an operational mode of said computer system to a suspend mode;

determining whether a wake-up signal has been generated;

when said wake-up signal is detected restoring said computer system to said operational mode existing prior to changing to said suspend mode; and returning to said step of determining whether said power switch has been moved to said off position; and when said user selects said reboot button:

quitting any active program;

rebooting said computer system; and returning to said step of determining whether said power switch has been moved to said off position.

2. The process of claim 1, further comprised of said menu being a window [in a Windows type] of *an* operating system[.] *with a graphical interface.*

3. The process of claim 2, further comprised of [said Windows type of] *the* operating system being a graphical interface that [allows said user to generate] *generates* a plurality of commands using a plurality of selectable icons and menus, said plurality of commands then translated into a code specific for said computer system.

4. The process of claim 1, further comprising the step of resetting said power switch prior to returning to said step of determining whether a power switch has been moved to said off position [when] *upon* any one of*:* said user selects said cancel button*,* said user selects said reboot button*,* and after said user has selected said suspend button said wake up signal is detected to restore said computer system to said operational mode.

5. The process of claim 1, further comprised of said step of determining whether said power switch has been moved to said off position further comprised of first waiting for said power switch to be returned to an on position when said power switch has been detected in said off position at least once since said computer system was booted up.

6. The process of claim 1, further comprising sending a power-off signal to a central processing unit for said computer system when said power switch is moved to said off position, said power-off signal not transmitted to a power controller for said computer system until said power-off button is selected and any active program is terminated, said power controller for said computer system terminating the power to said computer system when said power-off signal is received.

7. The process of claim 1, further comprising timing a period of time between when it is determined that said power switch has been moved to said off position and when said user selects a button contained in said menu, *wherein* when [said period of time equals] a predetermined period of time *lapses prior to said period of time,* said computer system changes said operational mode to said suspend mode.

8. The process of claim 7, further comprised of said computer system quitting any active program and terminating power to said computer system when [said period of time equals] said predetermined period of time *lapses* and said suspend mode is not enabled on said computer system.

9. A process for confirming a command to terminate power to a computer system, comprising the steps of:

determining whether a power switch has been moved to an off position while said computer system is powered;

displaying a menu for managing the power supplied to said computer system when said power switch is detected in said off position, said menu containing a plurality of buttons comprising a power-off button, a reset button, a suspend button and a cancel button, said reset button for rebooting said computer system and said suspend button for changing an operational mode of said computer system to a suspend mode;

starting a timer;

detecting a button of said plurality of buttons in said menu that is selected by a user, when said button is not selected by said user before said timer reaches a predetermined time proceeding when said timer has reached said predetermined time to said step for when said user selects said power-off button;

when said user selects said power-off button:

quitting any active program;

terminating the power to said computer system; and

*when said computer system is subsequently turned on,* returning to said step of determining whether said power switch has been moved to said off position; and when said user selects said cancel button:

returning to said step of determining whether said power switch has been moved to said off position.

10. The process of claim 9, further comprising the steps of:

when said user selects said suspend button:

changing said operational mode of said computer system to said suspend mode;

determining whether a wake-up signal has been generated;

when said wake-up signal is detected restoring said computer system to said operational mode existing prior to changing to said suspend mode; and returning to said step of determining whether said power switch has been moved to said off position; and when said user selects said reset button:

quitting any active program;

rebooting said computer system; and returning to said step of determining whether said power switch has been moved to said off position.

11. The process of claim 10, further comprising the step of resetting said power switch prior to returning to said step of determining whether said power switch has been moved to said off position [when] *upon* any one of*:* said user selects said cancel button, said user selects said reset button, and after said user has selected said suspend button said wake up signal is detected to restore said computer system to said operational mode from said suspend mode.

12. The process of claim 9, further comprised of said menu being a window [in a Windows type] of *an* operating system[.] *with a graphical interface.*

13. The process of claim 12, further comprised of [said Windows type of] *the* operating system being a graphical interface that [allows said user to generate] *generates* a plurality of commands using a plurality of selectable icons and menus, said plurality of commands then translated into a code specific for said computer system.

14. The process of claim 9, further comprising the step of resetting said power switch prior to returning to said step of determining whether said power switch has been moved to said off position [when] *upon* any one of*:* said user selects said cancel button, said user selects said reset button*,* and after said user has selected said suspend button a wake up signal is detected to restore said computer system to said operational mode from said suspend mode.

15. The process of claim 9, further comprised of said step of determining whether said power switch has been moved to said off position further comprised of first waiting for said power switch to be returned to an on position when said power switch has been detected in said off position at least once since said computer system was booted up.

16. The process of claim 9, further comprising sending a power-off signal to a central processing unit for said computer system when said power switch is moved to said off position, said power-off signal not transmitted to a power controller for said computer system until said power-off button is selected and any active program is terminated, said power controller for said computer system terminating the power to said computer system when said power-off signal is received.

17. The process of claim 9, further comprised of said computer system changing said operational mode to said suspend mode when a period of time reached by said timer equals said predetermined time when said suspend mode is enabled and not proceeding to said step for when said user selects said power-off button.

18. A computer system that avoids accidental termination of power, comprising:

a display device driven by a central processing unit running a power management program;

a power switch for said computer system, said power switch having an off position and an on position;

means for detecting one of said off position and said on position of said power switch;

a first power off signal generated by said central processing unit and sent to said power management program when said power switch is detected in said off position while said computer system is powered, said power management program causing a menu to be displayed on said display device when said first power off signal is received;

said menu containing a plurality of graphics including a first graphic representing a power off command, a second graphic representing a cancel command, a third graphic representing a reset command for rebooting said computer system and a fourth graphic representing a suspend command for changing an operational mode of said computer system to a suspend mode;

a timer controlled by said central processing unit started when said menu is displayed;

a second power off signal sent to a power controller for said computer system when any one of said first graphic is selected by a user and said timer reaches a predetermined period of time without said user selecting any one of said plurality of graphics, said power controller terminating power to said computer system when said second power off signal is received; and a cancel signal sent to said power management program when said second graphic is selected by said user, said power management program removing said menu and continuing to monitor a position of said power switch when said second graphic is selected.

19. The computer system of claim 18, further comprised of said menu being a window [in a Windows type] of *an* operating system[.] *with a graphical interface.*

20. The computer system of claim 19, further comprised of [said Windows type of] *the* operating system being a graphical interface that [allows said user to generate] *generates* a plurality of commands using a plurality of selectable icons and menus, said plurality of commands then translated into a code specific for said computer system.

21. A process for confirming a command to terminate power to a computer system, comprising the steps of:

determining whether a power switch has been moved to an off position while said computer system is powered, with said step of determining whether said power switch has been moved to said off position further comprised of first waiting for said power switch to be returned to an on position when said power switch has been detected in said off position at least once since said computer system was booted up;

displaying a menu for managing the power supplied to said computer system when said power switch is detected in said off position, said menu containing a plurality of buttons comprising a power-off button, and a cancel button;

starting a timer;

detecting a button of said plurality of buttons in said menu that is selected by a user, when said button is not selected by said user before said timer reaches a predetermined time proceeding when said timer has reached said predetermined time to said step for when said user selects said power-off button;

when said user selects said power-off button:

quitting any active program;

terminating the power to said computer system; and

*when said computer system is subsequently turned on,* returning to said step of determining whether said power switch has been moved to said off position; and when said user selects said cancel button:

returning to said step of determining whether said power switch has been moved to said off position.

22. A process for confirming a command to terminate power to a computer system, comprising the steps of:

determining whether a power switch has been moved to an off position while said computer system is powered;

displaying a menu for managing the power supplied to said computer system when said power switch is detected in said off position, said menu containing a plurality of buttons comprising a power-off button, and a cancel button;

sending a power-off signal to a central processing unit for said computer system when said power switch is moved to said off position, said power-off signal not transmitted to a power controller for said computer system until said power-off button is selected and any active program is terminated, said power controller for said computer system terminating the power to said computer system when said power-off signal is received;

starting a timer;

detecting a button of said plurality of buttons in said menu that is selected by a user, when said button is not selected by said user before said timer reaches a predetermined time proceeding when said timer has reached said predetermined time to said step for when said user selects said power-off button;

when said user selects said power-off button:

quitting any active program;

terminating the power to said computer system; and

*when said computer system is subsequently turned on,* returning to said step of determining whether said power switch has been moved to said off position; and when said user selects said cancel button:

returning to said step of determining whether said power switch has been moved to said off position.

23. A process for confirming a command to terminate power to a computer system, comprising the steps of:

determining whether a power switch has been moved to an off position while said computer system is powered;

displaying a menu for managing the power supplied to said computer system when said power switch is detected in said off position, said menu containing a plurality of buttons comprising a power-off button, and a cancel button;

starting a timer;

detecting a button of said plurality of buttons in said menu that is selected by a user, when said button is not selected by said user before said timer reaches a predetermined time proceeding when said timer has reached said predetermined time to said step for when said user selects said power-off button unless a suspend mode for said computer system is enabled, when said suspend mode is enabled changing an operational mode for said computer system to said suspend mode when a period of time reached by said timer equals said predetermined time;

when said user selects said power-off button;

quitting any active program;

terminating the power to said computer system; and

*when said computer system is subsequently turned on,* returning to said step of determining whether said power switch has been moved to said off position; and when said user selects said cancel button:

returning to said step of determining whether said power switch has, been moved to said off position.

* * * * *